(12) United States Patent
Smith, III

(10) Patent No.: US 6,206,040 B1
(45) Date of Patent: Mar. 27, 2001

(54) UNDERSEA HYDRAULIC COUPLING

(75) Inventor: Robert E. Smith, III, Missouri City, TX (US)

(73) Assignee: National Coupling Company Inc., Stafford, TX (US)

( * ) Notice: Subject to any disclaimer, the term of this patent is extended or adjusted under 35 U.S.C. 154(b) by 0 days.

(21) Appl. No.: 09/536,959

(22) Filed: Mar. 28, 2000

(51) Int. Cl.[7] .................................................... F16L 37/28
(52) U.S. Cl. .................. 137/614.04; 137/614; 251/149.7
(58) Field of Search ...................... 137/614.04, 614.05, 137/614.03, 614; 251/149.6, 149.7

(56) References Cited

U.S. PATENT DOCUMENTS

| | | |
|---|---|---|
| 1,944,124 | 1/1934 | Goodman . |
| 2,218,318 | 10/1940 | Pfauser . |
| 2,599,935 | 6/1952 | Pasker . |
| 2,727,759 | 12/1955 | Elliott . |
| 2,727,761 | 12/1955 | Elliott et al. . |
| 2,757,684 | 8/1956 | Ulrich . |
| 3,215,161 | 11/1965 | Goodwin et al. . |
| 4,774,983 | 10/1988 | Abe . |
| 5,099,882 | 3/1992 | Smith, III . |
| 5,203,374 | 4/1993 | Smith, III . |
| 5,469,887 | * 11/1995 | Smith, III ........................ 137/614.04 |
| 5,810,047 | * 9/1998 | Kirkman ..................... 137/614.04 X |
| 5,893,391 | * 4/1999 | Jenski, Jr. ....................... 137/614.04 |

* cited by examiner

*Primary Examiner*—Kevin Lee
(74) *Attorney, Agent, or Firm*—Fulbright & Jaworski

(57) ABSTRACT

An undersea hydraulic coupling having a stepped internal bore dimensioned to increase the flow rate through the coupling is disclosed. The coupling allows an increased flow rate without increasing the size or weight of the coupling, by positioning the poppet valve in the body section, rather than in the probe section, of the male coupling member.

11 Claims, 3 Drawing Sheets

UNDERSEA HYDRAULIC COUPLING

BACKGROUND OF THE INVENTION

1. Field of the Invention

The present invention relates generally to hydraulic couplings used in undersea drilling and production applications. More particularly, the invention involves an undersea hydraulic coupling member that is capable of holding higher pressures at increased flow rates without increasing the external dimensions or weight.

2. Description of Related Art

Subsea hydraulic couplings are old in the art. The couplings generally consist of a male member and a female member, with soft seals positioned within the female member to seal the junction between the male and the female members. The female member is generally a cylindrical body with a relatively large diameter longitudinal bore at one end and a relatively small diameter longitudinal bore at the other. The small bore facilitates connections to hydraulic lines, while the large bore contains soft seals and receives the male portion of the coupling. The male member includes a cylindrical portion, or probe, at one end having a diameter approximately equal to the diameter of the large bore of the female portion of the coupling. The male member also includes a connection at its other end to facilitate connection to hydraulic lines. When the cylindrical portion of the male member is inserted into the large bore of the female member, according to the various embodiments of the device, the soft seals, or O-rings, either abut the end or face of the male member or engage the cylindrical probe wall about its outer circumference. The hydraulic fluid is then free to flow through the female and male members of the coupling and seals prevent that flow from escaping about the joint and the coupling. A check or poppet valve may be installed in the female member and also in the male member. Each valve closes when the coupling is broken so as to prevent fluid from leaking out of the system of which the coupling is a part.

In U.S. Pat. No. 4,694,859 to Robert E. Smith, III, assigned to National Coupling Company, Inc., of Stafford, Tex., an undersea hydraulic coupling and metal seal is disclosed. This patent describes a reusable metal seal which engages the outer circumference of the probe when it is positioned within the female member bore. The metal seal is held in place by a retainer. When the male and female portions of the coupling are parted under pressure, the retainer prevents the metal seal from blowing out through the bore of the female member. The male and female members each have valve actuators extending from the poppet valves. When the male member enters the female member bore and the valve actuators are engaged, each of the poppet valves is urged opened and the poppet valve springs are compressed. U.S. Pat. No. 5,762,106 to Robert E. Smith, III, assigned to National Coupling Company, Inc., also shows an undersea hydraulic coupling and radial metal seal that engages the diameter of the probe or male member.

U.S. Pat. No. 4,900,071 to Robert E. Smith, III, assigned to National Coupling Company, Inc., shows an undersea hydraulic coupling with a two-piece retainer for restraining radial movement of a wedge-shaped annular seal into the central bore of the female member. The annular seal is restrained by a dove tail interfit with a mating shoulder on either the retainer sleeve, the retainer-locking member, or both parts. U.S. Pat. No. 5,052,439 also shows an undersea hydraulic coupling with a two-piece retainer having a dovetail interfit with an annular seal.

U.S. Pat. No. 5,390,702 to Robert E. Smith, III, assigned to National Coupling Company, Inc., shows an undersea hydraulic coupling having a male member with a stepped outer body to more accurately position and guide the male member into the seals, ensuring greater seal reliability and longer seal life. These step surfaces also help prevent implosion of the seals due to sea pressure when the end of the male member comes out of the seals.

Additionally, U.S. patent application Ser. No. 09/293,554 to Robert E. Smith, III, assigned to National Coupling Company, Inc., relates to an undersea hydraulic coupling having an extended probe section having a valve spring with a greater diameter then the diameter of the extended probe section, to provide sufficient forces to prevent the poppet valve of the male member from opening at high subsea pressures, and to reduce the diameter of the sealing surface.

In subsea hydraulic systems, it is desirable to increase flow rates through the system of which the couplings are a part. The flow rate through the coupling, and the lines attached to the coupling, are a function of the diameter of the internal bore through the coupling and lines. As known by those skilled in the art, the maximum flow coefficient through a coupling may be determined and calculated based on the dimensions of the coupling bore.

To withstand the higher pressures of hydraulic flow through a coupling, the body of the coupling member, and the probe section of the male member in particular, must be of sufficient thickness to withstand the internal working pressure and the pressure external to the coupler as a result of substantial ocean depths. Accordingly, as known by those skilled in the art, the metal thickness of the coupling body may be determined by the working pressure through the bore of the coupler, and the yield of the material from which the coupling is machined. However, increasing the size and thickness of the coupling member to accommodate higher working pressures and higher subsea pressures is problematic. Remote operating vehicles (ROVs) must frequently be used to transport, engage and disengage coupling members. The ROVs may be limited in weight and size capacity to transport and install coupling members. Frequently, multiple coupling members are connected to a manifold plate and must be transported and mated while subsea with couplings attached to an opposing manifold plate. To enable the remote operating vehicle to accomplish this work, it is desirable to minimize the size and weight of each coupling member. In the past, reducing the size and weight of the coupling member also requires reducing the flow rate or the capability of the coupling to handle higher pressures.

SUMMARY OF THE INVENTION

The present invention resides in an undersea hydraulic coupling of the foregoing type including male and female members for fluid communication therebetween and valves for controlling fluid flow in each of the members. The present invention includes a male member, or probe, having a stepped internal bore with a larger diameter bore in the first end, or body section, and a smaller diameter bore in the probe section. With the present invention, the coupling member allows increased flow rates through the coupling, and also increases the ability of the coupling member to hold higher pressures.

The poppet valve in the male coupling member is positioned in the larger diameter bore. The poppet valve is not positioned in the probe section, but is positioned in the body section of the male member. The valve actuator of the female member enters the probe section to engage the valve actuator of the male member. The poppet valve of the male member has a larger outer diameter than the outer diameter of the probe section of the male member that enters and seals with the receiving chamber of the female member of the coupling.

Accordingly, the present invention provides a coupling allowing a higher flow rate due to the larger bore, without increasing the coupling size or weight. Additionally, the coupling can hold higher pressures at increased ocean depths.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Figure 1:
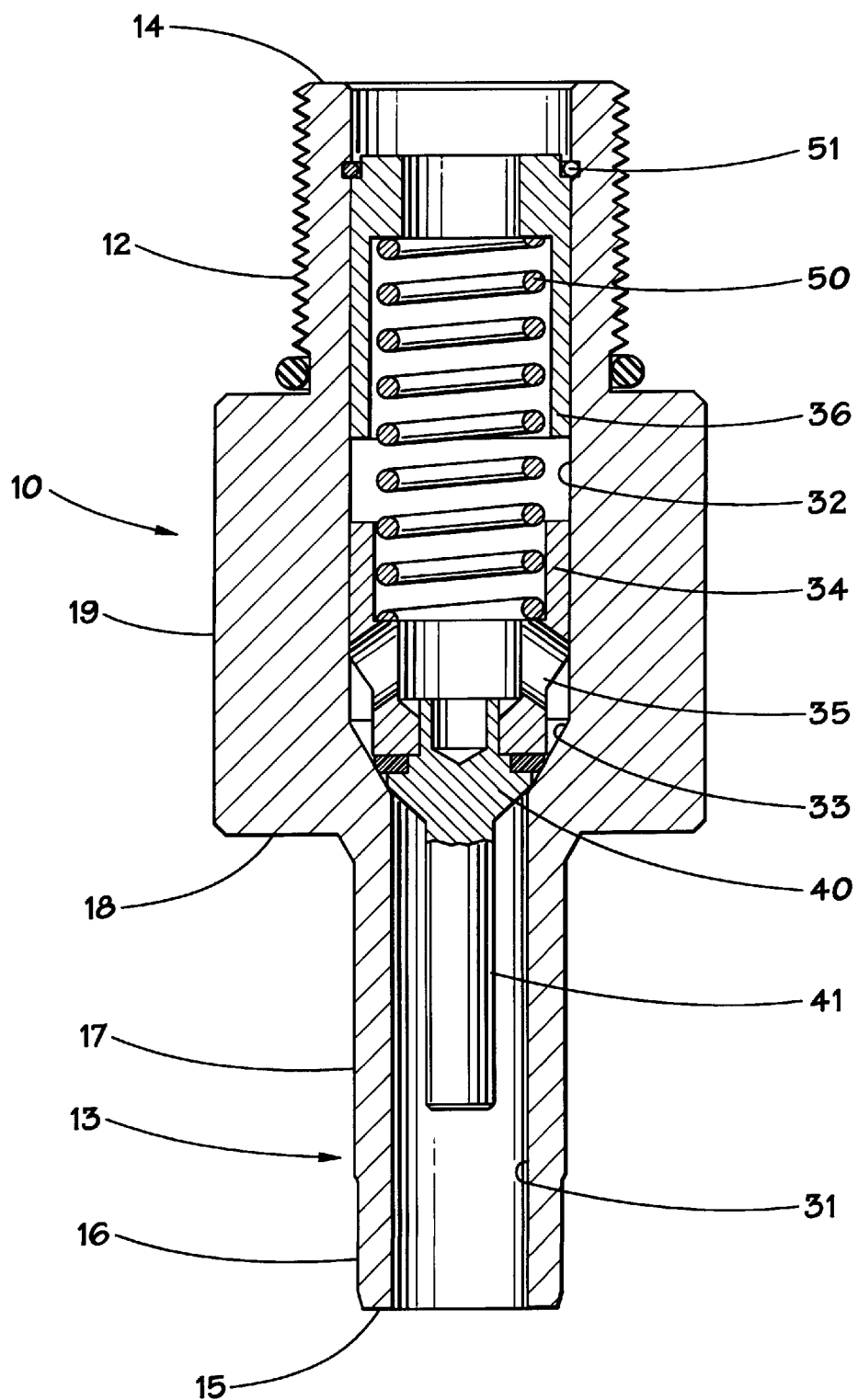
FIG. 1 is a cross-section view of a male member of the coupling according to a first preferred embodiment of the present invention.

FIG. 1 is a cross-section view of a male coupling member 10 which includes a threaded handle 12 adjacent the first end of the coupling, a body section 19 which terminates at shoulder 18, and a probe section 13. The probe section 13 preferably has a stepped external diameter, with larger diameter section 17 adjacent shoulder 18, and smaller diameter 16 of the probe section terminating at the second end or leading face 15 of the male coupling member. The male member has a stepped bore with a first section 32 extending from the first end 14 to conical valve seat 33 and a smaller diameter section 31 from the conical valve seat to the second end of the male member. The poppet valve assembly of the male member is slideably received within the first larger bore 32 of the male member. The poppet valve assembly includes cylindrical, hollow valve body 34 with valve body apertures 35. Valve head 40 is conical in shape and is dimensioned to seat and seal with valve seat 33. The conical valve head has an actuator or stem 41, extending longitudinally from the apex. Helical valve spring 50 urges conical valve face 40 to seal with conical valve seat 33. The helical valve spring is anchored with spring collar 36 which is held in place by collar clip 51.

Figure 2:
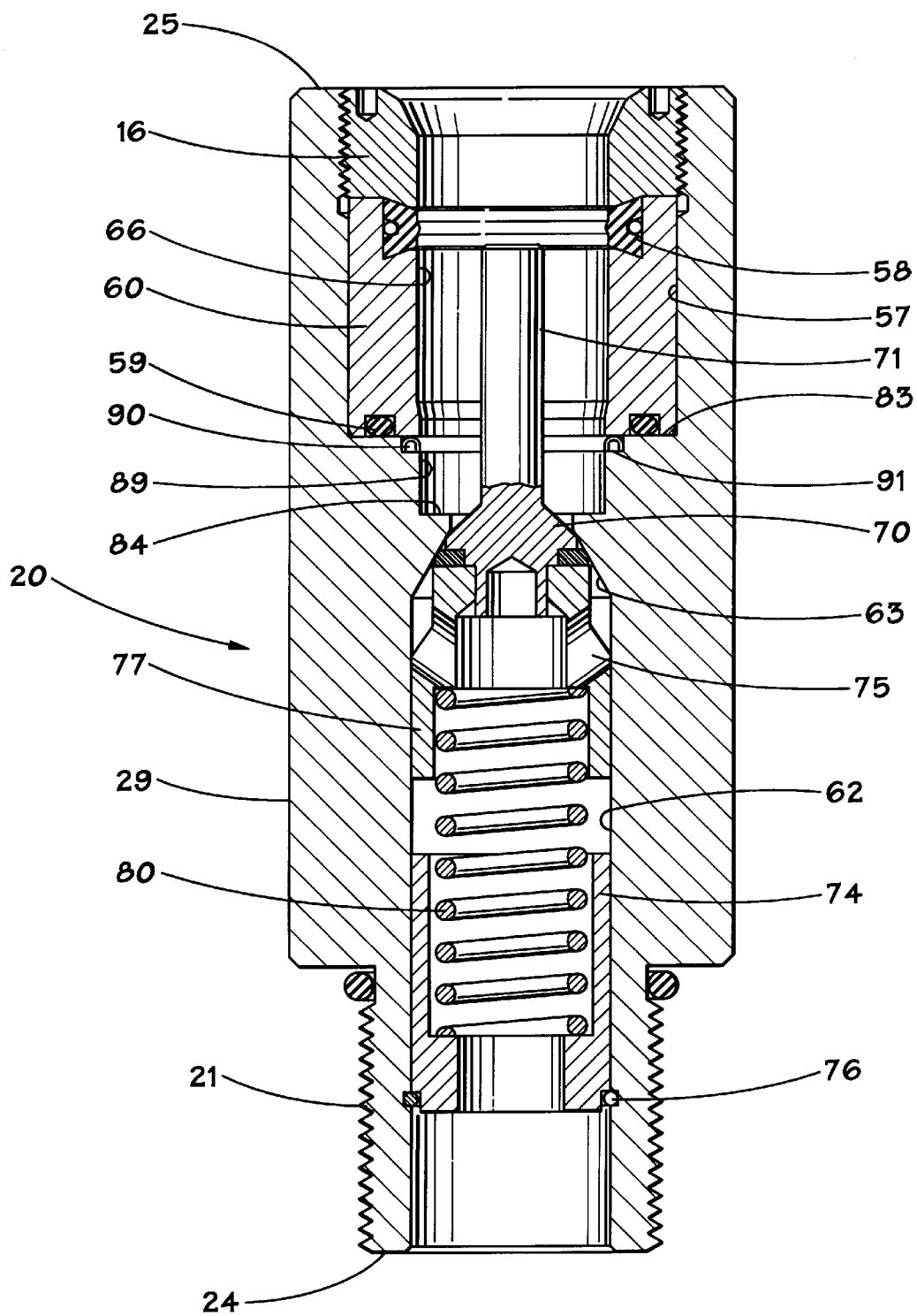
FIG. 2 is a cross-section view of a female member according to a first preferred embodiment of the invention.

Now referring to FIG. 2 of the drawing, the female member 20 of the coupling is shown. Female member 20 includes threaded handle 21 adjacent first end 24, and a cylindrical body section 29 terminating at second end 25. The female member has a central bore 62 extending from first end 24 to conical valve seat 63. The conical valve seat terminates at internal shoulder 84 which adjoins the receiving chamber of the female member. Preferably, a receiving chamber 82 has a stepped diameter to accommodate one or more seals. In a preferred embodiment, the first section 89 of the receiving chamber terminates at shoulder 91. A hollow, radial pressure energized seal 90 is positioned on shoulder 91. This seal may be expansible radially inwardly and outwardly to seal with the wall of the receiving chamber and the probe section of the male member, in response to hydraulic fluid pressure acting on the hollow portion of the seal. Sleeve shaped seal retainer 60 is inserted in the receiving chamber to abut shoulder 83, The seal retainer 60 has an internal bore 66 which is dimensioned to slideably receive the probe section of the male member. In a preferred embodiment, the internal bore 66 of the seal retainer is stepped to accommodate the probe section of the male member. Additionally, the seal retainer holds O-ring seal 59, which is preferably an elastomeric seal, against shoulder 83 in the female receiving chamber. Also inserted into the larger section 57 of the female member receiving chamber is a retainer locking member 61. In a preferred embodiment, the retainer locking member 61 is threaded to the internal wall 57 of the receiving chamber. An elastomeric seal 58, which forms a radial seal between the seal retainer and the male member probe, has a dove tail interfit between the seal retainer and the retainer locking member.

The poppet valve assembly of the female member includes conical valve face 70 and cylindrical valve body 77 with valve body apertures 75. The conical valve face 70 of the poppet valve seals against conical valve seat 63, as valve spring 80 urges the poppet valve into the closed position. Spring collar 74 is anchored to the female bore 62 with clip 76. Extending from the apex of the conical valve face is valve actuator or stem 71. As will be described in more detail, valve actuator 71 enters the probe section of the male member when the coupling members are engaged.

Figure 3:
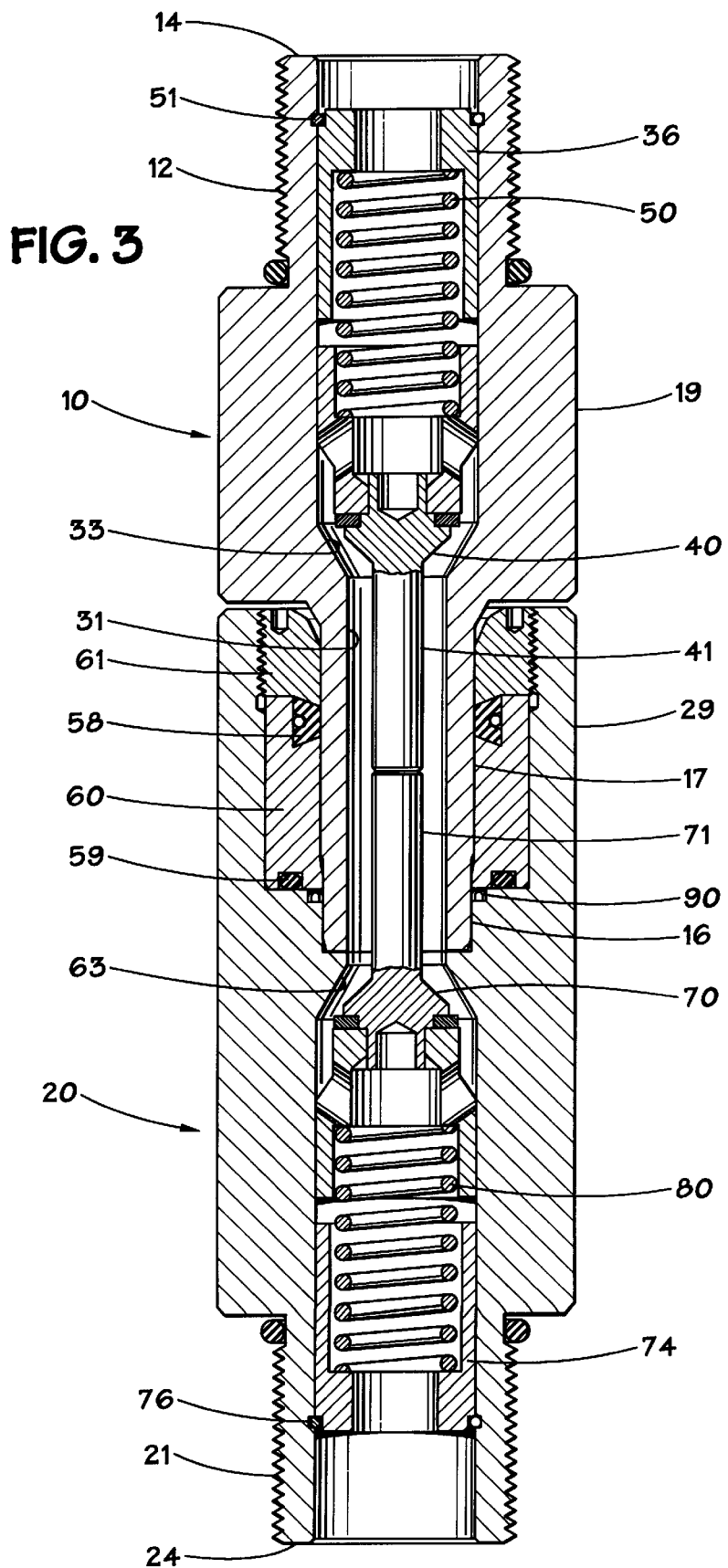
FIG. 3 is a cross-section view of the connected male and female coupling members according to a first preferred embodiment of the present invention.

Now referring to FIG. 3, the male and female coupling members are shown in a fully engaged position. The male member probe section enters the receiving chamber, whereby seal 58 engages diameter 17 of the probe section, and seal 90 engages diameter 16 of the probe section. The poppet valve actuator 71 of the female member enters bore 31 of the male member and engages actuator 41 of the male member poppet valve assembly. Upon mutual engagement of the poppet valve actuators, further insertion urges the valves open so that hydraulic fluid may be transmitted between the coupling members. When the male member is removed from the female member, valve springs 50 and 80 urge the poppet valves in the male and female members into the closed position to shut off the flow of hydraulic fluid.

The present invention allows an increased bore diameter in the male member or probe section without increasing the size or weight of the male member of the coupling. Accordingly, flow of hydraulic fluid may be increased without increasing the external dimensions or weight of the coupler. The invention allows an increased pressure rating and increased flow through the coupling. Preferably, the diameter of the poppet valve is greater than the outer diameter of the probe section of the male member. Similarly, the diameter of the first section of the male member bore in which the poppet valve slides is greater than the outer diameter of the probe section. By dimensioning the poppet valve to have a larger diameter than the probe section, the poppet valve must be positioned in the male member body rather in the probe section which enters the receiving chamber of the female coupling member. The valve actuator 41 of the male member may extend partially or completely through bore 31 to the leading face 15 of the male member. It also is desirable that the external diameter of the probe section be minimized to minimize the diameter against which the radial seal or seals engage. However, it also is desirable to increase the diameter of the internal bore in the male member, or both the male and female members, of the hydraulic coupling. With the larger bore, the present invention requires a larger poppet valve diameter, and a correspondingly higher flow rate through the bore than was possible before in undersea hydraulic couplings with the same or similar external dimensions and weight.

With the present invention, additional coupling members may be positioned in the same space, or on the same manifold plate. Alternatively, the same number of couplings may be positioned in a smaller area or on a smaller manifold plate. As the weight of the individual coupling members is reduced substantially, transportation coupling and uncoupling tasks are less difficult for multiple couplings attached to manifold plates, which are often handled by ROVs.

Although variations in the embodiment of the present invention may not each realize all the advantages of the invention, certain features may become more important than others in various applications of the device. The invention, accordingly, should be understood to be limited only by the scope of the appended claims.

What is claimed is:

1. An undersea hydraulic coupling comprising:
   (a) a female member having a first end and a second end, a receiving chamber adjacent the first end, a central bore extending between the receiving chamber and the second end, a poppet valve in the central bore for controlling fluid flow therethrough, the poppet valve having an actuator extending from the poppet valve, and at least one radial seal positioned in the receiving chamber; and
   (b) a male member having a first end and a second end, a cylindrical body adjacent the first end, a probe section extending between the cylindrical body and the second end, the probe section dimensioned to fit in the receiving chamber while the cylindrical body is completely outside the receiving chamber, a first bore extending through the cylindrical body and a second bore extending through the probe section, a poppet valve in the first bore having a body section that is outside the receiving chamber when the probe section is in the receiving chamber, an actuator extending into the second bore, the male member poppet valve having an external diameter larger than the diameter of the probe section, the poppet valve actuator of the female member entering the second bore of the male member when the probe section is in the receiving chamber.

2. The undersea hydraulic coupling of claim 1 further comprising a seal retainer inserted into the receiving chamber and holding the radial seal in place upon separation of the male and female members.

3. The undersea hydraulic coupling of claim 1 wherein the radial seal is a pressure-energized hollow seal.

4. The undersea hydraulic coupling of claim 1 wherein the probe section has a stepped external surface.

5. The undersea hydraulic coupling of claim 2 further comprising a retainer locking member engaged to the female member and an elastomeric seal having a dovetail interfit between the seal retainer and retainer locking member.

6. An undersea hydraulic coupling comprising:
   (a) a male coupling member having a central bore extending from a first end to a second end thereof, the male coupling member having a body with a larger diameter adjacent the first end and a smaller diameter adjacent the second end, a conical valve seat intermediate the central bore, and a poppet valve slidable in the central bore in the first end of the male coupling member and having a conical face dimensioned to seal against the conical valve seat when the poppet valve is in the normally closed position, a spring urging the poppet valve to the normally closed position, and a valve actuator extending from the conical face into the stepped central bore adjacent the second end;
   (b) a female coupling member having a receiving chamber dimensioned to receive the smaller diameter of the male member therein, the poppet valve of the male member remaining outside the receiving chamber, the female coupling member having a valve actuator configured to enter the second end of the male coupling member through the central bore of the male coupling member and urge the poppet valve of the male member open; and
   (c) a radial seal positioned in the receiving chamber and sealing between the receiving chamber of the female coupling member and the male coupling member.

7. The undersea hydraulic coupling of claim 6 wherein the central bore has a first larger diameter adjacent the first end of the male coupling member and a second smaller diameter adjacent the second end of the male coupling member.

8. The undersea hydraulic coupling of claim 6 wherein the poppet valve of the male coupling member is positioned in the first larger diameter of the male coupling member.

9. The undersea hydraulic coupling of claim 6 wherein the poppet valve of the male coupling member has an external diameter larger than the second smaller diameter of the male coupling member adjacent the second end thereof.

10. The undersea hydraulic coupling of claim 6 further comprising a poppet valve in the female coupling member, the valve actuator extending from the apex of the poppet valve.

11. The undersea hydraulic coupling of claim 6 further comprising a sleeve-shaped seal retainer engaged to the female coupling member for holding the radial seal in place upon separation of the male and female coupling members.

* * * * *